United States Patent
Schumacher

[15] 3,668,546
[45] June 6, 1972

[54] LASER STIMULATOR ASSEMBLY

[72] Inventor: Edward R. Schumacher, 4728 54th Street, San Diego, Calif. 92115

[22] Filed: Jan. 11, 1971

[21] Appl. No.: 105,447

[52] U.S. Cl.............................................................331/94.5
[51] Int. Cl................................................................H01s 3/09
[58] Field of Search...................................331/94.5; 330/4.3

[56] References Cited

UNITED STATES PATENTS

| | | |
|---|---|---|
| 3,504,298 | 3/1970 | Baugh, Jr. et al......................331/94.5 |
| 3,521,178 | 7/1970 | Herbrich................................331/94.5 |
| 3,560,872 | 2/1971 | Heimann ..............................331/94.5 |
| 3,460,054 | 8/1969 | Rambauske et al...................331/94.5 |

*Primary Examiner*—William L. Sikes
*Attorney*—R. S. Sciascia, G. J. Rubens and J. W. McLaren

[57] ABSTRACT

A laser stimulator assembly particularly suited for exciting a laser from an external position. An elongate source of laser excitation energy is positioned at the focal axis of an ellipsoidal reflector and together with cylindrical retro-reflectors and two extending plane reflectors directs the maximum amount of laser excitation energy to an elongate aperture with the minimum loss by reason of multiple reflections. The ellipsoidal reflector and the retroreflectors are positioned within a fluid-tight enclosure comprising a body member and two end members. Communication to the inside of the fluid-tight enclosure is provided through its end members for connection of the source of laser excitation energy to an external source of actuating energy. The same communication means in the form of an electrical conductor may, in the preferred embodiment, be hollow, providing a fluid path through the end members for circulating a cooling medium through the interior of the assembly and in contact with the elongate source of laser excitation energy to increase its efficiency. The cooling medium is preferably a selected fluid having desirable light transmissive and heat conduction properties, as well as being electrically non-conductive.

5 Claims, 3 Drawing Figures

PATENTED JUN 6 1972 3,668,546

INVENTOR.
EDWARD R. SCHUMACHER
BY 3,668,546

LASER STIMULATOR ASSEMBLY

STATEMENT OF GOVERNMENT INTEREST

The invention described herein may be manufactured and used by or for the Government of the United States of America for governmental purposes without the payment of any royalties thereon or therefor.

CROSS REFERENCES TO RELATED APPLICATIONS

The laser stimulator assembly of the present invention may be advantageously employed as an external source of laser excitation energy with a laser cell embodying the concept and teaching of U. S. Pat. application Ser. No. 110,904, filed Jan. 29, 1971, in the name of Erhard J. Schimitschek, and titled "Rotating Liquid-Cooled Laser Cell" and assigned to the assignee herein. However, the principles, teachings, and concepts of the present invention may be usefully and advantageously employed where there is a requirement for an external source of laser excitation energy and particularly where the laser excitation energy is to be directed to an elongate aperture, whether such aperture is associated with a rotating liquid laser cell or not.

BACKGROUND OF THE INVENTION

Since the advent of the successful operation of liquid lasers, many different and variant forms of liquid laser cells have been devised as well as numerous configurations of devices providing laser excitation energy. In general, the actuation and operation of a laser may develop considerable heat and if such heat is not properly and adequately dissipated by an appropriate cooling arrangement, the efficiency of the laser energy output may be adversely affected.

Accordingly, arrangements have been devised where the laser liquid itself is circulated through an external heat exchange device, or the member containing the liquid laser composition is surrounded and cooled by a circulating cooling medium to enhance the efficiency of the operation of the laser equipment.

In other laser arrangements a highly reflective internal ellipsoidal surface is provided and the source of excitation energy is positioned at one focal axis of the ellipsoidal surface, while the laser material to be energized is positioned at the other axis of the ellipsoidal surface. In such arrangements, an appropriate circulating fluid, such as gas, may be employed to maintain the laser composition at a desired and more efficient temperature.

More recently, a rotating liquid laser cell has been devised as disclosed in the referenced copending patent application. In the rotating liquid laser cell, an annular volumetric space is provided to contain the liquid laser composition and the liquid laser cell assembly is immersed in a coolant liquid which is circulated around and about the annular space containing the liquid laser composition. This novel and unique arrangement has the advantage that the liquid laser composition itself need not be circulated through a heat exchange and pumping equipment to provide effective cooling. At the same time, the rotating liquid laser cell is efficiently and adequately cooled by circulating the cooling medium around and about the annular volumetric space containing the liquid laser combination.

Moreover, as the rotating liquid laser cell is rotated, discrete, different, portions of the liquid laser composition are successively exposed to the source of laser excitation energy as it rotates past a window which admits such laser excitation energy for transmission to the liquid laser composition. Such a rotating liquid laser cell has numerous advantages. However, it requires a highly efficient external source of laser excitation energy. It was in contemplation of the requirement for a highly efficient external laser excitation source that the laser stimulator assembly of the present invention was conceived and devised. Though the laser stimulator assembly of the present invention was conceived for use with the rotating liquid laser cell, it is not limited to such use in that its teachings and concepts may be advantageously employed in any application where a highly efficient external source of laser excitation energy is required.

SUMMARY OF THE INVENTION

The present invention contemplates a laser stimulator assembly which is particularly conceived for directing laser excitation energy to an elongate aperture in a highly efficient manner and is especially useful when employed as a source of laser excitation energy which is external to the structure containing the laser material or laser composition itself.

The laser stimulator assembly of the present invention comprises an ellipsoidal reflector which is supported and positioned within a body member; the body member has a light-transmissive window aligned with the principal axis of the ellipsoidal reflector. The body member may be comprised entirely of highly light-transmissive material such as optical quartz, for example, in a tubular, cylindrical form. The concept of the present invention, however, requires only that a light-transmissive window be provided which is aligned with the principal axis of the ellipsoidal reflector and the body member may be of any adaptable configuration or shape which is suitable and appropriate to support the ellipsoidal reflector in alignment with the light-transmissive window.

End members are secured to the ends of the body member for forming a fluid-tight enclosure. In the case where the body member is tubular in shape, the end members may be basically of cylindrical configuration and may be secured to the ends of the body member to form a fluid-tight enclosure by use of appropriate O-ring seals positioned in recesses in the cylindrical outside surface of the end members and retained under suitable compression within the tubular shaped body member.

An elongate source of laser excitation energy, such as a flash tube, which may, for example, be of the Xenon type, is positioned within the body member at the focal axis of the ellipsoidal reflector. In the preferred embodiment of the present invention the focal axis of the ellipsoidal reflector is coincident with the central axis of the tubular body member.

The elongate source of laser excitation energy is required to provide the maximum laser excitation energy for emission through an elongate aperture and is supported by the end members at either end for external connection to a source of actuating energy. In the preferred embodiment of the present invention an electrically conductive fitting may extend through each end member for electrical connection to each end of the source of laser excitation energy which may typically be a Xenon flash tube, for example.

Two planar reflectors are positioned and supported in angular disposition to define a path having the minimum number of reflections for transmission of the laser excitation energy emitted from the light transmissive window to the elongate aperture.

In accordance with the concept and teaching of the present invention, the optimum length, angle, and disposition of the planar reflectors may vary with different applications depending upon a number of variable factors. These considerations, for example, include the size and width of the elongate aperture to which it is desired to direct the maximum amount of laser excitation energy, and also the disposition of the elongate aperture with respect to distance from the source laser excitation energy. Such determinative factors may be dictated or fixed in accordance with the requirements of different applications. Therefore, it is contemplated by the concept of the present invention that one skilled in the art and informed of the teaching of the present invention may either calculate or experiment to determine the size and angular disposition of the planar reflectors for defining an optimal optical path having the minimum number of reflections for laser excitation energy emitted from the light-transmissive window in its transmission to the elongate aperture and also compatible with all the factors characteristic of the particular application in which each laser simulator assembly is to be employed.

Cylindrical retroreflectors are disposed within the body member between the ellipsoidal reflector and the light transmissive window concentrically relative to the source of the laser excitation energy for maximizing the transmission of laser excitation energy by redirecting the energy impinging upon the cylindrical retroreflectors back to the ellipsoidal reflector and subsequent transmission to the elongate aperture. This feature of the present invention is necessary and highly advantageous in that laser excitation energy striking a further extended ellipsoidal reflector would result in multiple reflections and scattering, causing considerable heat absorption and loss of laser excitation energy. Consequently, the cylindrical retroreflectors are employed to redirect that portion of the laser excitation energy which would otherwise fall upon an extended ellipsoidal reflector, so that laser excitation energy is reflected back to the most efficient portion of the ellipsoidal reflector where it is then further reflected out through the planar reflectors to the elongate aperture without significant loss or absorption.

In accordance with the concept of the present invention, a fluid path is provided through each of the end members for admitting and discharging a cooling medium for circulation through the body member in intimate contact with the elongate source of laser excitation energy, cooling it and thereby rendering the assembly more efficient. Such cooling fluid medium may, in a typical preferred embodiment of the present invention, be a liquid which is electrically non-conductive and also possesses desirable light-transmissive, and heat-conductive properties such as distilled water, for example, where a Xenon flash lamp is used as the source of laser excitation energy. But the concept of the present invention contemplates any suitable cooling medium exhibiting the desired characteristics relative to the particular source of laser excitation employed and may include an appropriate gas, for example.

An added feature of the preferred embodiment of the present invention provides that the electrical connections passing through the end members for conducting electrical energy to a gaseous flash lamp, such a Xenon tube, for example, include a hollow portion through which the cooling medium may be passed. Therefore, the connectors through the end members perform the function of an electrical connection as well as providing a fluid path for circulating the cooling medium. In such an arrangement an insulating or non-conductive section of the fluid path external to the assembly may be employed to insulate the electrical conductors from the heat exchanger and circulating pump which is employed to circulate the cooling medium through the assembly.

In accordance with the concept and teaching of the present invention, the several types of reflectors in different configurations as described hereinbefore may preferably be surfaces coated with gold, silver, aluminum, or multiple dielectric coatings to provide maximum reflectivity relative to the nature and properties of the source of laser excitation energy.

Accordingly, it is a primary object of the present invention to provide a laser stimulator assembly to be used external to the laser material being stimulated for efficiently directing laser excitation energy to an elongate aperture adjacent that laser material.

A concomitant object of the present invention is to provide a stimulator assembly which is particularly adapted to direct laser excitation to the liquid laser material of a rotating liquid laser cell.

Yet another most important object of the present invention is to provide a laser stimulator assembly which affords the convenient change or replacement of either the source of excitation energy or the cooling medium around such source of laser excitation energy without disturbing the laser cell containing the laser composition to be stimulated.

A further object of the present invention is to provide an external laser stimulator assembly which may be cooled and maintained at a desired optimum temperature separately from the laser cell with which it is employed.

These and other features, advantages, and objects of the present invention will be better appreciated from an understanding of the structure and operation of a preferred embodiment of the new laser stimulator assembly as disclosed in the following description and as illustrated in the accompanying drawings.

DESCRIPTION OF THE PREFERRED EMBODIMENT

Figure 1:
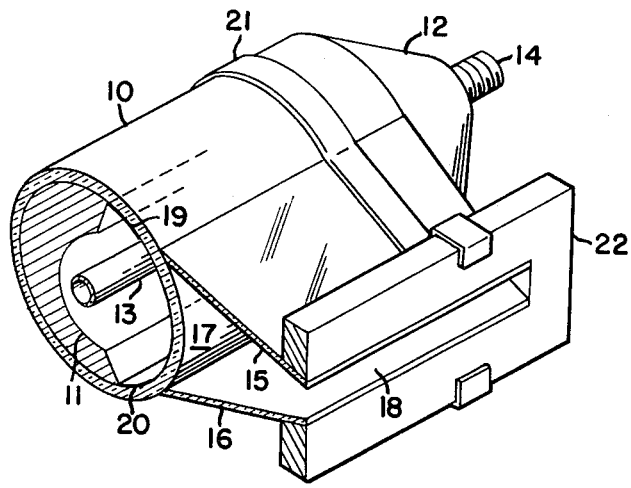
FIG. 1 is a partially cross-sectional perspective view of one preferred embodiment of the present invention.

FIG. 1 illustrates a preferred embodiment of the present invention in which a body member 10 has a cylindrical tubular form and may be fabricated of a suitable light-transmissive material such as optical quartz, for example. Supported and positioned within the body member 10 is an ellipsoidal reflector 11 which, in the particular embodiment illustrated, takes an outer cylindrical form fitted to the inside diameter of the body member 10 and includes an ellipsoidal surface which may be suitably coated to provide a highly reflective surface. Two end members, only one of which is shown in FIG. 1 at 12, are provided at either end of the body member 10; the end members are appropriately secured to the body member 10 to form a fluid-tight enclosure.

Supported and positioned within the body member 10 at the focal axis of the ellipsoidal reflector 11, is an elongate source of laser excitation energy 13, which may be a gaseous flash tube of the Xenon type in one particular embodiment, for example. An appropriate connector such as that shown at 14 is provided at each end of the assembly for making connection from the internal laser excitation source in the form of the Xenon flash tube 13, through the end members, and to an external source of actuating energy.

Oppositely positioned planar reflectors 15 and 16 are supported in an angular disposition for defining a light transmissive path having the minimum number of reflections for the laser excitation energy generated by the source of laser excitation energy 13 and emitted from the light-transmissive window 17 in the body member 10 in its transmission to an elongate aperture 18.

In order to affect maximum efficiency in the transmission of laser excitation energy to the window 18, two cylindrical retroreflectors 19 and 20 are provided and disposed in concentric relation to the source of laser excitation energy 13, between the ellipsoidal reflector 11 and the light-transmissive window 17. The transmission of laser excitation is maximized by redirecting that amount of laser excitation energy falling on the retroreflectors back to the most efficient portion of the ellipsoidal reflector for transmission through the light-transmissive window 17 and ultimate emission from the elongate aperture 18.

A fluid path is provided through each of the end members, such as that illustrated at 14 in FIG. 1, for circulating a suitable cooling medium through the interior of the assembly and in contact with the elongate source of laser excitation energy 13 within body member 10 for maintaining the source of laser excitation energy 13 at a desirably efficient temperature and enhancing the operation of the laser stimulator assembly. Appropriate straps such as that illustrated at 21 secure the planar reflectors 15 and 16 and the slotted member 22, which defines the elongate aperture 18, in proper disposition relative to the light-transmissive window 17 of the body member 10.

Figure 2:
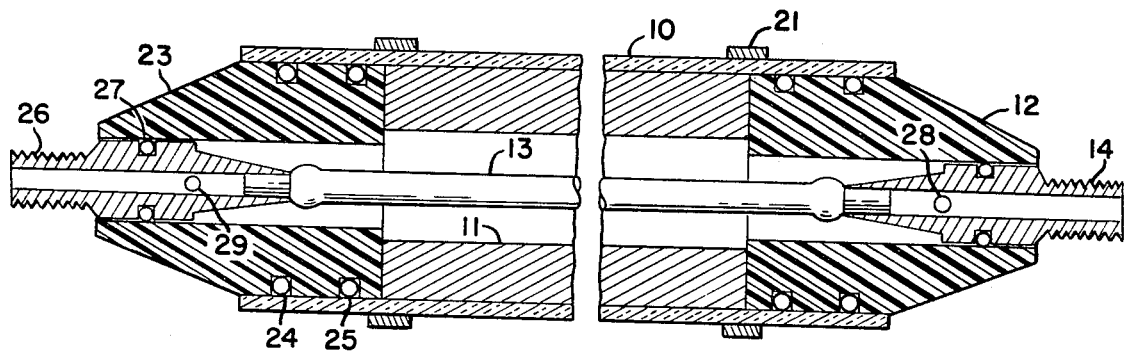
FIG. 2 is a lengthwise cross-sectional view of a preferred embodiment of the present invention.

FIG. 2 is a lengthwise cross-sectional view of the preferred embodiment illustrated perspectively in FIG. 1. In FIG. 2 identical components bear the same numerical designation as in FIG. 1.

As may be seen more clearly in the cross-sectional detail of FIG. 2, the end members 12 and 23 are identical and, as is illustrated in the lefthand end member 23, each of the end members includes recessed portions which receive O-rings, such as illustrated at 24 and 25, bearing in compression upon the inside diameter of the body member 10 to provide a fluid-tight seal therebetween. The end member 23 is bored out to receive a fitting 26 which similarly is recessed to receive an O-ring 27 providing a fluid-tight seal between the end member 23 and the fitting 26 so that the assembly constitutes a pressure-tight internal chamber.

The fitting 26 is hollow and preferably fabricated of a metal having good electrical conductivity so that a source of actuating energy, such as an electrical source, for instance, may be connected to the fittings 26 and 14 to complete an electrical path through the fittings and the source of laser excitation energy 13 to the source of electrical energy, thereby actuating the source of laser excitation energy 13, which may be a Xenon flash lamp.

The source of excitation energy 13 has metallic terminals at either end which are received into and make electrical contact within the metallic fittings 26 and 14. As will be noted, the fittings 26 and 14 are hollow so that they afford a fluid path for circulating a cooling medium into and around the source of laser excitation energy 13 to provide operation at optimum efficiency. The fittings 26 and 14, in addition to being connected to a source of electrical energy, may also be connected to a source of circulating cooling medium such as distilled water, for example, through appropriate insulating conduits. The fittings 26 and 14 it will be noted, have transverse holes 29 and 28 which permit free flow of the cooling medium into and out of the fluid-tight enclosure notwithstanding that the electrical terminals of the source of laser excitation energy 13 are received and supported in the hollow ends of the respective fittings 26 and 14.

Accordingly, fittings 26 and 14 serve the dual purpose of electrical connections through the end members 23 and 14, respectively, to the interior of the assembly for the actuation of the laser excitation energy source 13, and also as a fluid path permitting the free flow and circulation of an appropriate cooling medium for maintaining the laser excitation energy source 13 at the most efficient temperature for the maximum emission of energy.

Figure 3:
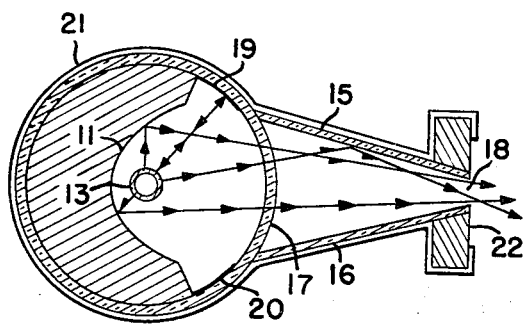
FIG. 3 is an end cross-sectional view of a preferred embodiment of the present invention.

FIG. 3 is an endwise cross-sectional view of the embodiment of the present invention illustrated in FIGS. 1 and 2 and illustrates the manner in which the ellipsoidal reflector 11 coacts with the source of excitation energy 13, the cylindrical retroreflectors 19 and 20, and the planar reflectors 15 and 16, to direct the maximum amount of laser excitation energy from the source 13 to the elongate aperture 18, while minimizing dissipation and scattering effects.

In FIG. 3, by following the arrows of the illustration, it may be seen that laser excitation energy emitted by the source 13 in a wholly upward direction (designated by optical path $a$) strikes the ellipsoidal reflector 11, and is then reflected out the aperture 18. However, that laser excitation energy generated by the source 13 which is emitted in a direction upwardly and to the right at approximately 45° (designated by optical path $b$), will strike the retroreflector 19, be reflected directly whence it came, emerge from the opposite side of the source 13 to strike the most efficient portion of the ellipsoidal reflector 11, and then be directed out the elongate aperture 18. In an identical manner the cylindrical retroreflector 20 operates to redirect the laser excitation energy striking it, back to the ellipsoidal reflector 11 for reflection through the elongate aperture 18.

Thus, the concept of the present invention, contemplating the particular combination of ellipsoidal reflectors, together with planar reflectors and cylindrical retroreflectors disposed therebetween, eliminates the scattering and dissipation of energy which would otherwise result from disadvantageous angles of reflection by the outer extremities of an extended ellipsoidal reflector and/or multiple reflections by the planar reflectors 15 and 16.

That laser excitation energy transmitted through the light-transmissive window at an angle which does not permit it to pass directly through the elongate aperture 18 (designated by the optical path $c$) is reflected from one or both of the planar reflectors 15 and 16 which are disposed angularly to affect the minimum number of such reflections consistent with the predetermined spatial disposition of the source of laser excitation relative to the elongate aperture 18 and the laser composition which is to be excited.

Accordingly, the present invention provides a laser stimulator assembly of significantly enhanced efficiency, especially useful in directing laser excitation energy from a source to an elongate aperture through the combination of an ellipsoidal reflector, cylindrical retroreflectors, and planar reflectors disposed as conceived and disclosed herein.

Moreover, the preferred embodiment of the present invention provides additional advantages, not essential to the fundamental concept, by combining both fluid and electrical communication to the sealed interior of the assembly in unitary elements.

Obviously many modifications and variations of the present invention are possible in the light of the above teachings. It is therefore to be understood that within the scope of the appended claims the invention may be practiced otherwise than as specifically described.

What is claimed is:

1. A laser stimulator assembly for directing laser excitation energy to an elongate aperture comprising:
   an ellipsoidal reflector supported and positioned within a body member,
   said body member having a light-transmissive window aligned with the principal axis of said reflector;
   electrically non-conductive end members secured to the ends of said body member for forming a fluid-tight enclosure;
   an elongate source of laser excitation energy positioned within said body member at the focal axis of said ellipsoidal reflector and supported by said end members;
   electrical conductors supported by said end members, in electrical contact with said elongate source of laser excitation energy for external connection to a source of actuating energy, each of said electrical conductors having a fluid conduit for circulating a cooling medium in a continuous path from one said conduit to the other and in contact with the entire exterior surfaces of said elongate source of laser excitation energy positioned therebetween;
   planar reflectors positioned and supported in angular disposition for defining a path having the minimum number of reflections for laser excitation energy emitted from said window in its transmission to said elongate aperture;
   cylindrical retroreflectors disposed within said body member concentrically relative to said source of laser excitation energy and between said ellipsoidal reflector and said window for maximizing the transmission of laser excitation energy by redirecting it to said ellipsoidal reflector; and
   a cooling medium for circulating through said fluid path,
   said cooling medium being electrically non-conductive, and possessing heat-conductive and light-transmissive properties matched with the emission characteristics of said elongate source of laser excitation for optimum efficiency of operation.

2. A laser stimulator assembly as claimed in claim 1 wherein said reflectors comprise surfaces coated with one of the materials from the group consisting of, gold, silver, aluminum, and multiple dielectrics.

3. A laser stimulator assembly as claimed in claim 1 wherein said body member is a hollow cylinder of selected light-transmissive material.

4. A laser stimulator assembly as claimed in claim 3 wherein said light-transmissive material is quartz.

5. A laser stimulator assembly as claimed in claim 4 wherein said end members are secured in fluid-tight contact within said body by means of O-rings.

* * * * *